INVENTOR.
JAMES R. WHITTEN
HIS ATTORNEY

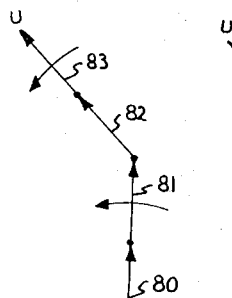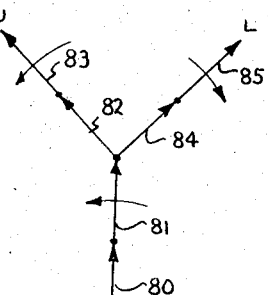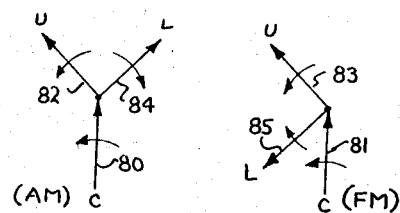
FIG. 2   FIG. 3   FIG. 4   FIG. 5
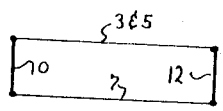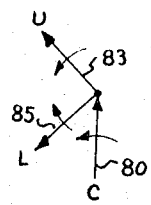
FIG. 6   FIG. 7
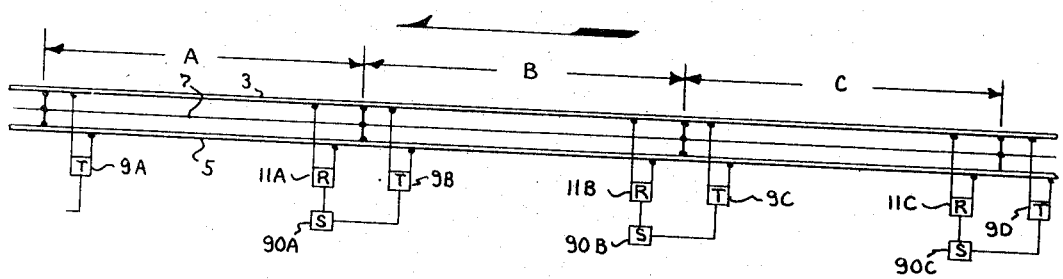
FIG. 8
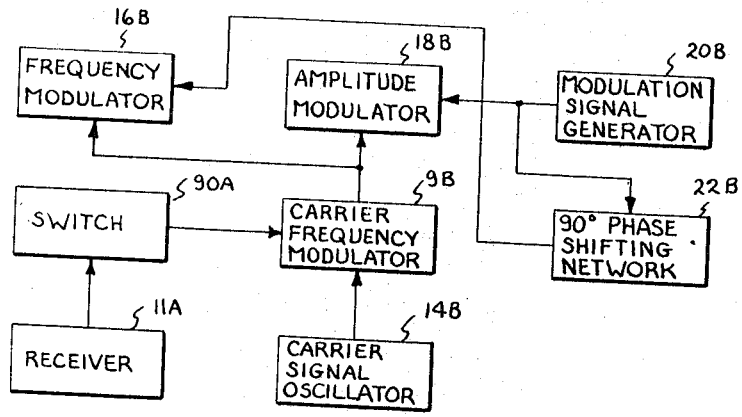
FIG. 9

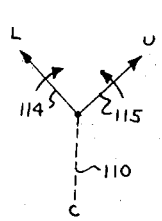 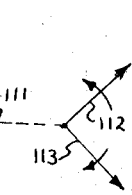 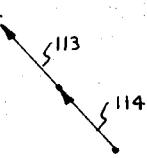 
FIG. 11    FIG. 12    FIG. 13    FIG. 14
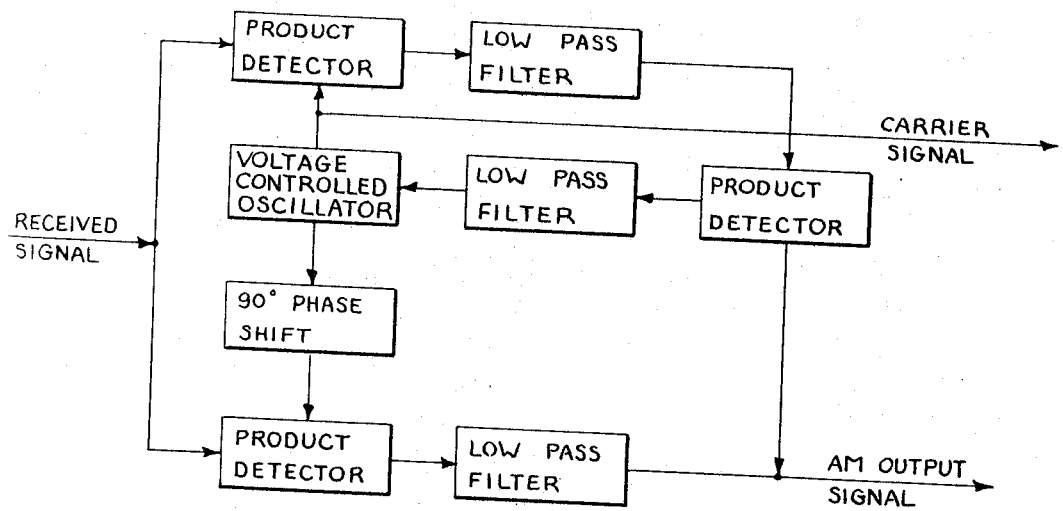
FIG. 15

United States Patent Office 3,450,873
Patented June 17, 1969

3,450,873
RAIL VEHICLE DETECTION SYSTEM
James R. Whitten, Scotia, N.Y., assignor to General Electric Company, a corporation of New York
Filed Feb. 20, 1967, Ser. No. 617,099
Int. Cl. B61l 21/06, 25/02
U.S. Cl. 246—34                                 19 Claims

ABSTRACT OF THE DISCLOSURE

A track circuit includes an "earthed" third conductor mounted near (preferably between) the track rails so as to be sensitive to ballast impedance changes. Two modulated signals are generated one AM and the other FM. The AM signal is applied cross one rail and the third conductor and the FM signal to the other rail and the third conductor. A receiver is connected to the track circuit arranged to add the two signals so that the absence of a vehicle between the signal source and the receiver is indicated by reception of a modulated AM carrier and the presence of a vehicle by reception of a modulated FM carrier.

---

The present invention relates to rail vehicle control systems, and more particularly relates to systems wherein the speed and/or location of one rail vehicle is controlled relative to the location of another rail vehicle.

Where two or more rail vehicles travel along the same track it is necessary to detect the location of the advance vehicle and relay this information to the succeeding vehicle which can then adjust its speed accordingly. In order for the system to be fail-safe, the detection system must be accurate and reliable. In the past, the location of rail vehicles was detected by a current or voltage level detector. The right of way was divided into a plurality of zones, and one such detector was located in each zone. A signal was also generated in each zone. The presence or absence of a rail vehicle within the zone was then detected by the change in current or voltage level occasioned by the presence or absence of the train. Where the zone was unoccupied, the detector detected a current or voltage level within the zone which was above the predetermined threshold level. When a train was present within a zone, however, the wheel and axle of the train provided a shunting impedance causing the signal level within the zone to drop below the threshold level, thus indicating that a train was present. The detected occupancy or non-occupancy was then relayed back to the oncoming train which adjusted its speed accordingly.

A problem occurred in the operation of the signal level type of system in that adverse weather such as rain, snow, sleet and the like along the right of way also provided a shunting impedance across the rails. Since the shorting impedance caused by the adverse weather is similar to the shorting impedance caused by the train, a problem arises in determining whether the change in circuit impedance was caused by a train, or merely by adverse weather. This problem is difficult to overcome, requiring a very sensitive detector, and careful calculations. A further disadvantage with the prior system is that electrical noise sometimes interferred with the transmission of a signal. Moreover, inter-train communication along the rails between two rails vehicles was impossible where there was an intervening rail vehicle as the intervening vehicle short circuited the signal.

Accordingly, an object of the present invention is to produce a system which is independent of adverse weather conditions and which may provide a reliable indication of zone occupancy irrespective of the weather and independently of ballast leakage resistance.

Another object of the present invention is to provide a system which suppresses electrical noise. A still further object of the present invention is to provide a system wherein inter-train rail communication is not shorted by an intervening train. Another object is to accomplish the foregong objects with a system which is fail-safe and reliable.

The invention generally contemplates forming a pair of circuits within each zone by the use of a common third conductor, transmitting a modulated signal of one characteristic in one of the circuits and a second modulated signal of a different characteristic in the second circuit wherein the presence of a train short circuits only a portion of each signal, and means associated with the zone which determine zone occupancy or nonoccupancy by detecting loss of a component of each signal.

In a more specific aspect of the invention, for example, one of the signals may be amplitude modulated producing a first pair of sidebands and the other signal may be frequency modulated producing a similar pair of sidebands. One of the corresponding sideband pairs is of the same phase but the other sideband pair is out of phase relative to each other. For example, in a particular case the two upper sidebands are in phase and the two lower sidebands are out of phase. Detection means are then provided to determine when the out of phase components have been shorted out by the presence of a train.

The novel features believed characteristic of the invention are set forth with particularly in the appended claims. The invention itself, however, together with further objects and advantages thereof may best be understood by reference to the following description taken in connection with the accompanying drawings in which:

FIG. 2 is a phasor diagram of the output of the summer 64 when a train is present within the zone;

FIG. 3 is a phasor diagram of the output of the summer 64 when no train is present within the zone;

FIG. 4 is a phasor diagram of the first signal at the output of the transmission means of FIG. 1;

FIG. 5 is a phasor diagram of the second modulated signal at the output of the transmission means of FIG. 1;

FIG. 6 is an equivalent circuit indicating the electrical effect of combining the first and second circuits into one circuit when a train is present;

FIG. 7 is a phasor diagram of the safety check summer 70 when no train is present;

FIG. 8 is a schematic fragmentary view of adjacent zones illustrating the relay of zone occupancy information;

FIG. 9 is a schematic fragmentary view of a modification of the system of FIG. 1;

FIG. 11 is a phasor diagram of the first circuit signal of the embodiment of FIG. 10;

FIG. 12 is a phasor diagram of the second circuit signal of the embodiment of FIG. 10;

FIG. 13 is a phasor diagram of the output at upper sideband filter 126 when a train is present or absent;

FIG. 14 is a phasor diagram of the output at lower sideband filter 128 when a train is absent; and FIG. 15 is a schematic fragmentary view of a modified portion of the system of FIG. 1 illustrating a modified form of transmission and receiving means utilizing carrier suppression and reinsertion.

It is to be understood that the diagrams in block form show only a single line interconnecting the various blocks for simplicity and that each of such elements would be provided with another line returned to a point of common reference potential to complete each of the circuits.

Also, although the invention will be described herein in detail for implementation wherein one signal is amplitude modulated and another signal is frequency modulated, it is to be understood that other modulation arrangements, such as phase modulation, may be employed as desired.

Figure 1:
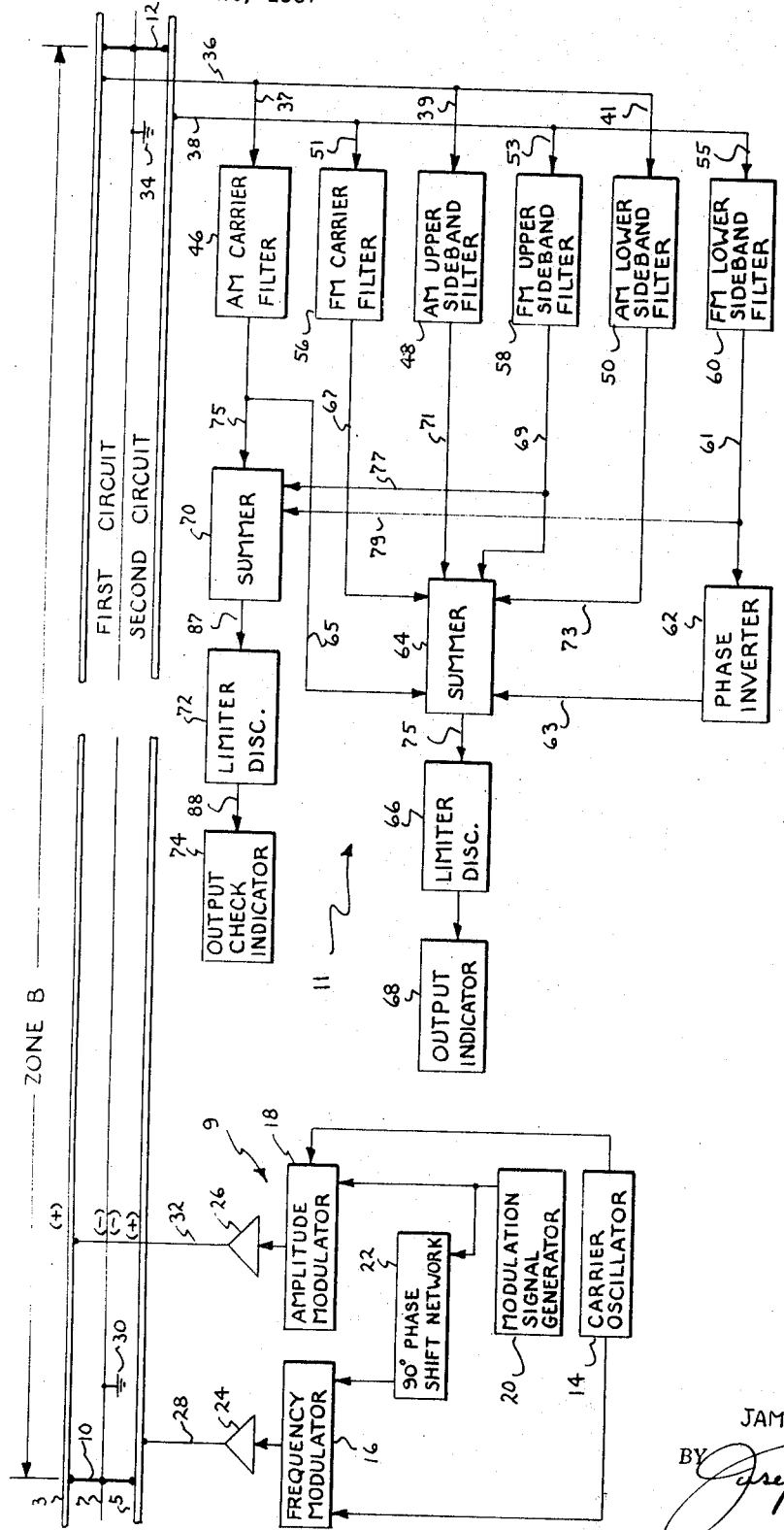
FIG. 1 is a schematic fragmentary view of a system in accordance with one form of the invention.

Referring now to the drawings, FIG. 1 illustrates a preferred embodiment of the invention. A pair of conventional track rails 3 and 5 respectively, upon which the trains to be detected will travel, are disposed along the right of way. A third conductor 7 parallels the rails. The third conductor 7 may be mounted between the rails 3 and 5 or alongside one of them. It is grounded by any convenient means such as being fastened to the ties, or, where the rail is mounted above the ground, such as a power rail, by grounding it periodically by series resonant circuits tuned to resonate at the frequencies of the novel train detection signals described hereinafter. The rails and conductor are divided into a plurality of sequential zones, one of which is shown as zone B. The limits of the zones are defined in any suitable manner such as by insulated track joints, series resonant circuits, low impedance cross-bonds or the like. As shown, the zones are formed by shorting connections (cross-bonds) 10 and 12 which span the rails 3 and 5 and the conductor 7 at the ends of the zone; in addition the shorting connections 10 and 12 are connected as shown to both rails and the conductor 7 so that two circuits are conveniently provided within each zone. The first circuit for each zone includes one running rail 3 and the third conductor 7. The second circuit includes the other running rail 5 and the third conductor 7.

Transmission means, shown generally at 9, are provided in each zone for applying a first modulated signal in the first circuit and a different, second, modulated signal, in the second circuit. The signals are applied so that each of the rails 3 and 5 within the zone has the same carrier polarity with respect to the common third conductor 7 as indicated by the plus and minus signs in FIG. 1. Receiving means, indicated in general at 11, are operably connected to the first and second circuits adjacent the far end of the zone for receiving the first and second signals, or any portions thereof, which reach the far end of the zone. The wheels and axle of the trains which pass through the zone are adapted to connect, or shunt, the rail 3 and 5 but not the third conductor 7 thereby shorting a portion of the signal.

As shown, receiving means 11 includes pass filter means 46-60 which separate the different components of the signal in the first and second circuits. Means, such as circuits 62, 64, 66 and 68 are provided for combining these separated signal components in such manner that where a train is present in a zone only one type of modulation appears in the output. Where a train is not present, another type of modulation appears in the output.

A preferred system employs amplitude modulation (AM) in one of the circuits, such as the first circuit, and frequency modulation (FM) or phase modulation in the other. Frequency modulation is preferred. A preferred means of generating the AM and FM signals and coupling them in the first and second circuits is illustrated in FIG. 1. A carrier oscillator 14 provides an identical carrier for both the first and second signals. The output of the carrier oscillator 14 is fed to a frequency modulator 16 and an amplitude modulator 18. A modulation signal generator 20 is provided whereby the corresponding upper and lower sidebands of both signals have the same frequency and by suitable gain adjustment can be made to be of substantially the same amplitude.

The output of the modulation signal generator 20 is fed to the amplitude modulator 18 and also through a phase shifting network 22 to the frequency modulator 16. Phase shifting network 22 shifts the phase of the output of the modulation signal generator 90°. The output of the frequency modulator 16 and the output of the amplitude modulator 18 are amplified in the respective amplifiers 24 and 26 which also provide an impedance matching for the respective first and second circuits. The carrier oscillator 14, modulation signal generator 20, phase shifting network 22, amplitude modulator 18, frequency modulator 16 and amplifiers 24 and 26 may be of any suitable or conventional type. Preferably frequency modulator 16 should be selected having a deviation ratio of no greater than about 1 in order that the FM signal in the second circuit will have only two effective sidebands. A deviation ratio of approximately 1 is preferred. Amplitude modulator 18 is preferably arranged to provide for an amplitude modulation of about 90%.

The output of the amplifier 24 (the FM signal) is coupled to the second circuit by conductor 28 which is connected to the rail 5. The output from amplifier 26 (the AM signal) is coupled to the first circuit by conductor 32 which is connected to the rail 3. The signals should be so related that at the carrier frequency in each of the rails 3 and 5 they have the same polarity with respect to the common third conductor 7. The input of the receiving means 11 may be coupled to the rails 3 and 5 in the same manner as the output of the transmission means 9 was coupled, such as by conductors 36 and 38 respectively.

It is understood that the conductors 28 and 32 are spaced a sufficient distance from the shorting connection 10 in order that the impedance of the intervening track and third conductor 7 is sufficient to prevent shorting of the signal. Similarly, it is understood that the FM signal and the AM signal could be connected in the circuit by other means such as suitable inductive coupling means (not shown).

The receiving means 11 picks up the AM and FM signals from the respective first and second circuits. A plurality of pass filter means 46-60 in the receiving means 11 separates the carriers and sidebands. For example, the output of the first circuit may be fed from conductor 36 by conductors 37, 39 and 41 to AM carrier filter 46, AM upper-sideband filter 48 and AM lower-sideband filter 50, respectively. The output from the second circuit may be fed from conductor 38 by conductors 51, 53 and 55 to FM carrier filter 56, FM upper-sideband filter 58, and FM lower sideband filter 60, respectively. The output of FM lower-sideband filter 60 is fed to a phase inverter 62 by conductor 61 and thence by conductor 63 to summer 64. The outputs of the remaining filters 46, 48, 50, 56 and 58 are fed directly to the summer 64 as by conductors 65, 71, 73, 67 and 69 respectively. The summer inputs are then additively combined in the summer 64 in such a manner that their characters are preserved. The output of summer 64 is then fed by conductor 75 to a limiter-discriminator 66 and thence to an output indicator 68.

The operation of the system may best be understood by reference to the phasor diagrams of FIGS. 2 and 3. For example, if a train is located within the zone, a frequency modulated type signal will appear at the output of the summer 64 (FIG. 2). If a train is not present, an amplitude modulated signal will appear (FIG. 3). Thus, since limiter-discriminator 66 (FIG. 1) is sensitive only to frequency modulation, an output signal will appear at indicator 68 only if a train is present.

It is preferred that a fail-safe feature be provided. This is accomplished as shown in FIG. 1, by feeding a portion of the output from the AM carrier filter 46, FM upper-sideband filter 58 and the FM lower-sideband filter 60 by the respective conductors 75, 77 and 79 to a summer 70 where the outputs are additively combined in a manner similar to that already described with respect to summer 64. The output from the summer 70 is then fed by conductor 87 to a limiter-discriminator 72 which is sensitive only to frequency modulations. The output of the limiter-discriminator 72 is fed by conductor 88 to output check indicator 74 so that if there is a failure in the receiving means 11, the transmission means 9, or a break in the conductor 7 or rails 3 or 5, no output will appear at the output check indicator 74.

In the preferred embodiment of FIG. 1, a predetermined relationship should be established between the transmitted AM and FM signals. First: AM and FM signals should have substantially identical carriers; this is accomplished in the embodiment of FIG. 1 by having a common carrier oscillator 14. Second: the lower sideband of the AM signal should be the same frequency as the lower sideband of the FM signal; and the upper sideband of the AM signal should be the same as the upper sideband of the FM signal. The corresponding identity of the frequencies is achieved by the use of a common modulation signal generator 20. The preferred production of only two FM sidebands is accomplished by the selection of an FM modulator arranged to provide a deviation index of about 1. Third: one pair of corresponding sidebands of both the AM and FM signals (for example, the upper sidebands U) should be of equal amplitude and phase as shown in the phasor diagrams of FIGURES 4 and 5; the other pair of corresponding sidebands (in this case the lower sidebands L) should be of equal amplitude but out of phase. The phase difference is accomplished by the elements illustrated in FIG. 1 by providing a common modulation signal generator 20 having an output which is coupled directly into the amplitude modulator 18 and through the phase shifting network 22 (which shifts the phase of the output of the modulation signal generator 20 by 90°) to the frequency modulator 16.

Where no train is on the track within the zone, both AM and FM signals will be received by receiving means 11, the carriers 80 and 81, upper sidebands 82 and 83 and lower sidebands 84 and 85 will be separated by the respective filters 56, 58, 60 and 46, 48 and 50. The lower-sideband 85 of the FM signal is reversed by the phase inverter 62, as aforesaid, and the components are then added in the summer 64. As can be seen by the phasor diagram of FIG. 3, the resultant output of summer 64 is an amplitude modulated signal. Since an amplitude modulated signal is not indicated in the output indicator 68 of the discriminator 66, an absence of an output at indicator 68 indicates the absence of a train within the zone.

When a train is present, the wheels and axle of the train will shunt the rails 3 and 5 of the first and second circuits. In effect, the first and second circuits are combined electrically into a single circuit as shown in the equivalent circuit diagram FIG. 6. When this happens, the lower sidebands 84 and 85 of the signals, being out of phase, cancel, and the receiver receives only the carriers 80 and 81 and the upper sidebands 82 and 83. These elements feed to their respective filters and thence to the summer 64 which then provides an output as illustrated in the phasor diagram of FIG. 2 which contains only the carrier signals 80 and 81 and the in-phase sidebands (in this case, the upper sidebands 82 and 83). The resulting signal is sensed by the FM discriminator 66, and the presence of a signal at output indicator 68 indicates that a train is present; where there is no train, all the components of the signals (with the phase of the FM lower sideband 85 pre-inverted by inverter 62) appear in the summer 64. Since such a combined signal is of the AM type, as shown in the phasor diagrams of FIG. 3, the signal is not sensed by the limiter-discriminator 66 and no signal appears at output indicator 68.

One of the advantages of the present invention is that it operates independently of weather conditions. Should a shunting effect across the rails and conductor occur due to adverse weather, only the degree of the output will be affected, but not its character. Thus whether adverse moisture conditions exist on the track or not, there is no ouput at indicator 68 when there is no train in the zone. When a train is in the zone, an output is present at indicator 68 irrespective of the weather conditions. The output may be diminished in value, but there will be an output, thus indicating the presence of a train. Thus, an additional advantage of the present system is that it is independent of slight differences in degree.

In order to obtain the fail-safe features of the invention, the carrier 80 is picked up from the first circuit (AM circuit) and the upper sideband signal 83 and lower sideband signal 85 are picked up from the second circuit (FM circuit) and fed to their respective filters and thence to a summer 70, heretofore described. Since the carrier voltage and frequency are identical for both the AM and FM signals, the combined AM carrier 80 with the FM sidebands 83 and 85 will produce a FM signal as indicated in FIG. 7. The FM signal is detected by the discriminator 72 (FIG. 1) and an output exists continually at the output check indicator 74. Should there be a fault anywhere in the system either the carrier 80 or one or both of the sidebands 83 and 85 fail, and the signal will no longer be FM in character and so that no output will be present at the output check indicator 74. Suitable relay means (not shown) may be provided for signalling the oncoming train to come to an emergency stop whenever there is no output at the output check indicator 74.

One method of signalling a succeeding train with respect to advance zone occupancy is to modify the frequency of the transmitted carrier signals in a preceding zone relative to the presence of an advance train in an advance zone. For example, FIG. 8 shows adjacent zones, A, B and C wherein the output of receiving means 11 of one zone is operably connected by switching means 90 to the transmitting means 11 of the preceding zone. One suitable arrangement of elements for example is illustrated in FIGURE 9 wherein the letter subscript corresponds to the respective zone with which the elements are operably associated. Thus, the switching means 90A is operably connected between the output 68 (FIG. 1) of the reeciving means 11A and a carrier modulator 91 which may be inserted in the transmitting means 9B to modulate the carrier frequencies 80 and 81 of the first and second signals.

Assume the trains are travelling from right to left on the rails of the embodiment of FIG. 8. When an advance train, not shown, enters zone A, its presence is detected by receiving means 11A causing switching means 90A to key the modulator 91 (FIG. 9) of transmitting means 9B to vary the carrier signal of zone B by a predetermined amount. Assume further, for example, that the carrier oscillator of zone B is generating a signal of 600 c.p.s. (which indicates no train present in the advance block) prior to the entry of a train into zone A. When a train enters zone A, the frequency of transmitter 9B is changed to 200 c.p.s. by the switching means 90A indicating that a train is present in the advance block. The succeeding train (not shown) has a receiver (not shown) and suitable coupling means, such as an inductive coupling (not shown) to extract the signal from the track as it travels through zone B. Programming means (not shown) may be provided to control the speed of the train depending on the frequencies of the carrier signal extracted from the tracks. That is, the track circuit signals govern the passage of the train through the zone. Similarly, the existence of failure of a component, as indicated by a loss of signal at output check indicator 74, may be relayed by suitable relay means (not shown) to change the transmitter frequency of the preceding zone to 200 c.p.s., the code which designates train presence or system failure. The carrier modulated system also provides a convenient means of inter-train communication since the presence of the train shorts only one of the AM sidebands.

Figure 10:
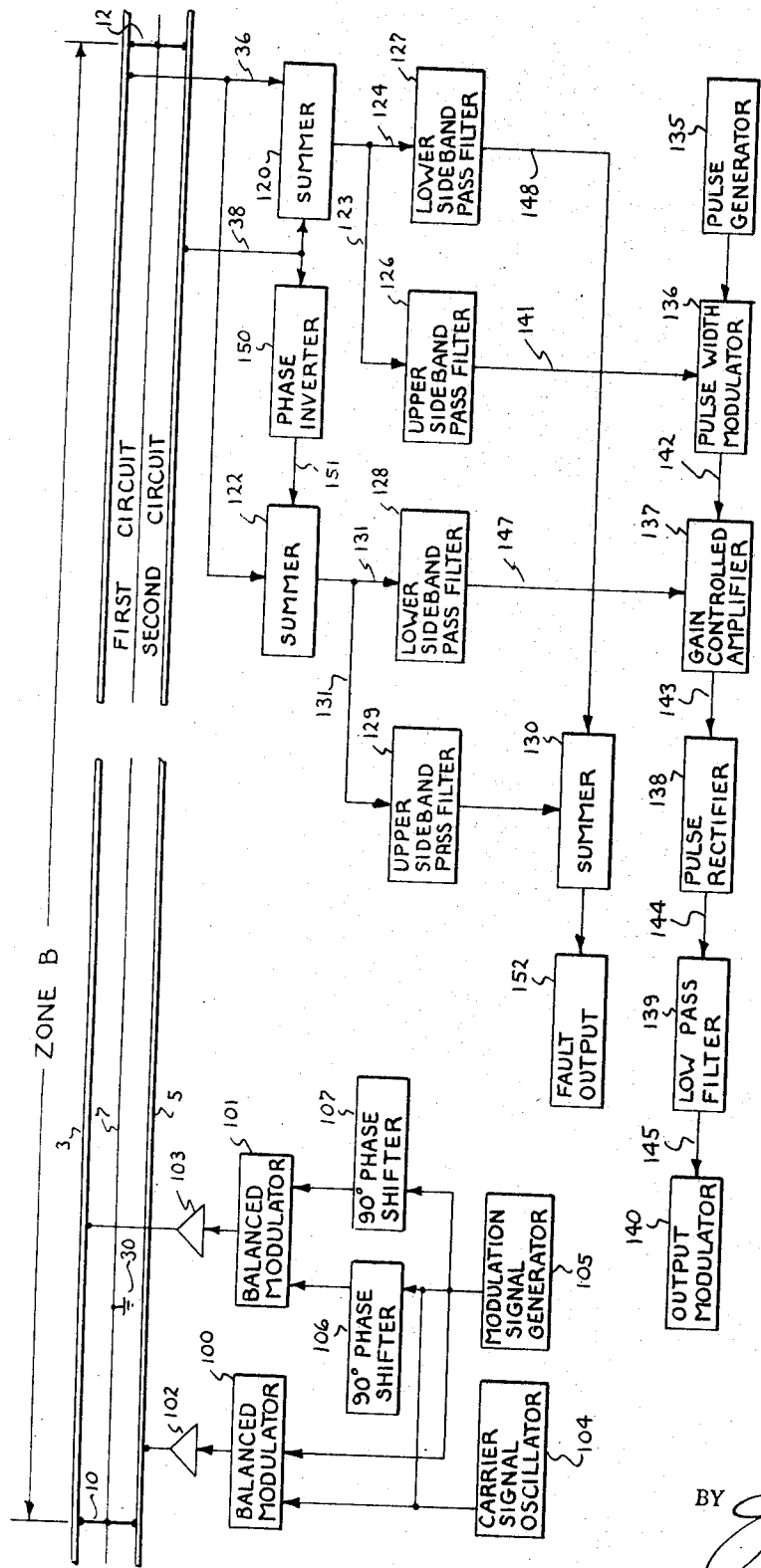
FIG. 10 is a further modification of the invention illustrating a system employing carrier suppression and ratio detection.

In FIG. 10 there is shown another embodiment of the invention employing a double sideband suppressed carrier system which does not require a reinserted carrier. As shown in FIG. 10 balanced modulators 100 and 101 produce double sideband suppressed carrier signals, which are amplified in amplifiers 102 and 103, respectively. The output of one amplifier 102 is connected in the second circuit (rail 5 and conductor 7) and the output of the other amplifier 103 is connected in the first circuit (rail 3 and conductor 7), by suitable connection means, such as described above in connection with the embodiment of FIG. 1. A signal, such as indicated in the phasor diagram of FIG. 11, is thus transmitted in the first circuit, and a signal, such as indicated in the phasor diagram FIG. 12 is transmitted in the second circuit. The suppressed carriers 110 and 111 are shown in dotted lines. The phases of the sidebands 112 and 113 of the signal in the second circiut have been shifted 90° relative to the sidebands 114 and 115 of the signal in the first circuit by phase shifter 107 which is connected between the modulation signal generator 105 and the balanced modulator 101. By the foregoing arrangement, the two upper sidebands 112 and 115 of the signals are in phase, whereas the two lower sidebands 114 and 113 of the signals are out of phase.

When a train is in the zone, the wheels and axle of the train span the rails thereby, in effect, creating one circuit. Since there is no potential difference between the in phase upper sidebands 112 and 115, their transmission to the receiving means will be unaffected by the presence of the low shunting impedance across the rails 3 and 5. However, since there is a potential difference between the out of phase lower sidebands 113 and 114, these signals are shorted out by the wheels and axle of the train in a manner comparable to that described in connection with the embodiment of FIG. 1.

The presence or absence of a train may then be indicated at the receiving means by obtaining the ratio of the sum of the portions of the two modulated signals which reach the receiver to the difference of such portions. When a train is present and the lower sidebands 113 and 114 are shorted out, the foregoing ratio will be zero and there will be no output at the receiving means. When there is no train, all sidebands will be received, the ratio will be some positive amount and there will be an output at the receiving means. Since the foregoing ratios are independent of weather, zero output indicates the presence of a train and a positive output indicates the absence of a train whether the rail ballast is wet or dry.

The receiving means of FIG. 10 includes a summer 120 which responds to the sum of the signals applied thereto. Summer 120 may be connected across both the first and second circuits in any suitable manner such as by connection means 36 and 38.

A second summer 122 is also suitably connected across both circuits. However, the input from the second circuit is fed through a phase inverter 150 before being fed by conductor 151 into the summer 122. As a result of this phase inversion of the signal from the second circuit, the output of summer 122 responds to the difference between the two signals applied thereto. The output from summer 120 is fed by conductor 123 to upper sideband pass filter 126. Since the upper sidebands 112 and 115 are not affected by the shunting action of the train, an output such as in FIG. 13 will appear at upper sideband filter 126 irrespective of the presence or absence of a train.

The output from summer 122 is fed by conductor 131 to lower sideband pass filter 128. Since the lower sidebands 113 and 114 are transmitted out of phase they will be short circuited by a train; accordingly, there will be no output at lower sideband filter 128 when a train is present. However, where there is no train, the lower sidebands will reach the receiving means and the out of phase component will be phase inverted in phase inverter 150 prior to the combining of the signals in summer 122. Thus an output, as indicated in FIG. 14, will appear in the output of summer 122, and a corresponding output will appear in the output of lower sideband filter 128. If the ratio of the output of upper sideband filter 126 to the output of lower sideband filter 128 is taken, its value will be zero when a train is present and positive when a train is absent. Changes due to the weather will lower the outputs of lower sideband filter 128 and upper sideband filter 126 equally rather than affecting the ratio. Thus, such ratio is independent of the shunting effects caused by weather and the like.

A preferred method of detecting the aforesaid ratio is to feed the output from the upper sideband filter 126 by conductor 141 into a pulse width modulator 136 which varies the width of a pulse, produced by a pulse generator 135, in accordance with the magnitude of the output voltage of the upper sideband filter 126. The output of the pulse width modulator 136 and of the lower sideband filter 128 are fed by conductors 142 and 147, respectively, into a gain controlled amplifier 137 wherein the height of the output of the pulse width modulator is varied inversely to the output of the lower sideband filter 128. The output of the gain controlled amplifier 137, therefore, provides a pulse whose area is proportional to the ratio of the upper sidebands (112 and 115) to the lower sidebands (113 and 114). This signal is then fed by conductor 143 to rectifier 138 where it is changed to a unidirectional pulse. The output of rectifier 138 is fed by conductor 144 to low pass filter 139 which filters out the alternating current component and thence by conductor 145 to an output indicator 140.

The pulse generator 135 may be, for example, a low duty factor stable generator which generates equally spaced pulses. The pulse width modulator may be any suitable or well known type. For example, voltage $E_1$ may control the amount of charge on a capacitor (not shown) periodically charged and then discharged to an arbitrary voltage within a linear region of a RC curve—the time for discharge being a linear function of initial charge.

Gain controlled amplifier 137 may be of any suitable type arranged to provide an output which is proportional to the output of lower sideband filter 128 divided by the output of upper sideband filter 126.

A fail-safe arrangement may be incorporated into the system as illustrated in FIG. 10. In such embodiment, the output from summer 120, is also fed by conductor 124 to the lower sideband filter 127. Lower sideband filter 127 ordinarily produces a zero output whether a train is present or not, since the lower sidebands are either shunted by the train or (where there is no train) cancelled in the summer 120. If, however, one of the rails is broken, only one of the sidebands appears in the summer 120 and an output appears in lower sideband filter 127. This output from lower sideband filter 127 is then applied over conductor 148 to the summer 130 which produces an output indicating a fault. Accordingly, the output of lower sideband filter 127 provides for a convenient means of detecting broken rails or equipment failure.

A further fail-safe feature is achieved by feeding a portion of the output of summer 122 to upper sideband filter 129 over conductor 131. When both upper sideband signals 112 and 115 are present on both rails, the output of upper sideband filter 129 is zero and this is so whether a train is present in the zone or not. If one of the upper sideband signals is absent, however, an output is present at filter 129 which feeds into summer 130 to provide an indication of a failure in the system.

Suitable switching means (not shown) comparable to those previously described may be provided to relay a signal to an oncoming train to come to a stop whenever an output appears in the fault output 152 of summer 130.

In another modification of the invention, the signals may be transmitted without a carrier. This may be accomplished, for example, by using carrier suppression modulators in place of the conventional frequency and amplitude modulators and a suitable carrier insertion arrangement in place of the two carrier filters 56 and 46. Such carrier suppression techniques are well known in the art and the manner of their implementation into the system of the present invention will be understood in view of the foregoing description; one such arrangement being illustrated in FIG. 15, for example.

Having shown preferred embodiments of a novel train detection system which is independent of weather changes, it is believed obvious that other modifications and variations of the invention are possible in the light of the above teachings. It is, therefore, to be understood that changes may be made in particular embodiments of the invention described which are within the full intended scope of the invention as defined by the appended claims.

What I claim as new and desire to secure by Letters Patent of the United States is:

1. A rail vehicle zone occupancy detection system having one or more zones each comprising: a pair of track rails; a conducting means paralleling said rails; circuit forming means to establish a first circuit including one of said rails and said conducting means and a second circuit including the other of said rails and said conducting means; transmission means associated with the first and second circuits so as to transmit a first modulated signal in said first circuit and a second modulated signal in said second circuit; receiving means operably connected to each of said circuits at a point remote from said transmitting means and adapted to receive said signals; combining means associated with said receiving means to combine the portions of said signals received by the receiving means; and detection means associated with said combining means to indicate whether the relationship of at least portions of said signals have been varied between transmission and receipt.

2. A system according to claim 1, wherein each signal has a first sideband and a second sideband, said first sidebands being of substantially the same frequency and of the same polarity relative to each other and said second sidebands being of substantially the same frequency relative to each other, but of different polarity relative to each other.

3. A system according to claim 2 wherein said first sidebands are of substantially the same magnitude, and said second sidebands are of substantially the same magnitude relative to each other and of opposite polarity.

4. A system according to claim 2, wherein each signal includes a carrier.

5. A system according to claim 2, including suppression means associated with the transmission means to suppress the carrier of at least one of said modulated signals, and carrier reinsertion means associated with said receiving means to reinsert said carrier prior to said combining means.

6. A system according to claim 1, wherein said first signal is amplitude modulated.

7. A system according to claim 6, wherein said second signal is frequency modulated.

8. A system according to claim 6, wherein said second signal is phase modulated.

9. A system according to claim 1 wherein said first and second signals are phase modulated with the phase of said first signal being different from the phase of the second signal.

10. A system according to claim 1, wherein said detection means includes means to derive a ratio between a portion of said first signal and a portion of said second signal.

11. A system according to claim 3, wherein said receiving means includes separating means prior to the combining means to separate the received sidebands, of each modulated signal, and phase reversal means to reverse the polarity of one of the said sidebands of opposite polarity.

12. A system according to claim 11, wherein one of said signals is amplitude modulated and the other of said signals is frequency modulated, and wherein said detection means includes means to determine the kind of modulation present at the output of the combining means.

13. A system according to claim 10, wherein each signal has a first sideband and a second sideband, said first sidebands being of substantially the same frequency and of the same polarity, and said second sidebands being of substantially the same frequency relative to each other, but of different polarity, and wherein said means to determine a ratio includes means to determine the difference in magnitude between said first sidebands and said second sidebands.

14. A system according to claim 1, including means to produce one output when the relative level of one portion of at least one signal remains unchanged between the transmission and receipt thereof and a different output when said relative level is changed, and means to relay the respective output to a succeeding train.

15. A rail vehicle zone occupancy detection system in accordance with claim 1 wherein said output varies upon the elimination of portions of each signal between transmission and receipt.

16. A rail vehicle zone occupancy detection system having one or more zones each comprising: a pair of track rails; means to transmit a signal of one kind of modulation along one of said rails; means to transmit a signal of another kind of modulation along the other of said rails; receiving means adapted to receive said signals; and means for analyzing said signals to produce an output dependent on changes which have occurred in the signals between transmission and receipt; said means to analyze the signals including combining means associated with said receiving means adapted to combine the portions of the signal received by the receiving means and to produce one output when the combined signals are of one kind of modulation and another output when the combined signals are of another kind of modulation.

17. A system according to claim 16 including phase shifting means associated with the receiving means, wherein at least a portion of at least one of the received signals is phase shifted prior to being fed to the combining means.

18. A system according to claim 16 wherein a portion of each signal is fed to other analyzing means to determine whether another change in the signals has occurred which indicates a break in the system.

19. A railway vehicle zone occupancy detection system having one or more zones each comprising a pair of track rails, means for generating first and second signals, each having at least a first and second sideband, means for transmitting said first signal along one track rail and said second signal along another track rail, receiving means for receiving said first and second signals, means responsive to the first sidebands of the received first and second signals to provide an indication of the presence or absence of a vehicle in the zone.

References Cited

UNITED STATES PATENTS

| 1,687,111 | 10/1928 | Skene. |
| 2,089,836 | 8/1937 | Martin _____ 246—34 XR |
| 2,975,272 | 3/1961 | Renick et al. _____ 246—34 |

FOREIGN PATENTS 1,045,957  10/1966  Great Britain.

ARTHUR L. LA POINT, *Primary Examiner.*

G. H. LIBMAN, *Assistant Examiner.*